(12) United States Patent
Khlat et al.

(10) Patent No.: US 10,476,534 B2
(45) Date of Patent: Nov. 12, 2019

(54) MULTI-BAND RADIO FREQUENCY CIRCUIT

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/798,901

(22) Filed: Oct. 31, 2017

(65) Prior Publication Data

US 2018/0159563 A1 Jun. 7, 2018

Related U.S. Application Data (60) Provisional application No. 62/430,703, filed on Dec. 6, 2016.

(51) Int. Cl.
| | |
|---|---|
| *H04M 1/00* | (2006.01) |
| *H04B 1/00* | (2006.01) |
| *H01Q 1/52* | (2006.01) |
| *H01Q 5/50* | (2015.01) |
| *H01Q 3/24* | (2006.01) |
| *H01Q 1/24* | (2006.01) |

(52) U.S. Cl.
CPC .............. *H04B 1/0064* (2013.01); *H01Q 1/52* (2013.01); *H01Q 1/523* (2013.01); *H01Q 3/24* (2013.01); *H01Q 5/50* (2015.01); *H01Q 1/243* (2013.01)

(58) Field of Classification Search
CPC ........ H04B 1/0064; H01Q 5/50; H01Q 1/243; H01Q 1/523; H01Q 1/52
USPC ... 455/78, 23, 552.1, 561, 73, 77, 83, 150.1, 455/571, 575.7
See application file for complete search history.

(56) References Cited

U.S. PATENT DOCUMENTS

| | | | | |
|---|---|---|---|---|
| 8,314,653 | B1 * | 11/2012 | Granger-Jones | ........ H03F 1/223 327/552 |
| 8,682,260 | B1 * | 3/2014 | Granger-Jones | ..... H04B 1/0475 455/339 |
| 9,985,667 | B1 * | 5/2018 | Ma | ........................ H04B 1/0475 |
| 2003/0153348 | A1 * | 8/2003 | Lahlum | .................. H04B 1/406 455/575.7 |

(Continued)

*Primary Examiner* — Edward F Urban
*Assistant Examiner* — Max Mathew
(74) *Attorney, Agent, or Firm* — Withrow & Terranova, P.L.L.C.

(57) ABSTRACT

Embodiments of the disclosure include a multi-band radio frequency (RF) circuit. The multi-band RF circuit includes multiple antenna ports coupled to multiple antennas and an antenna swapping circuit coupled to the multiple antenna ports. Control circuitry in the multi-band RF circuit controls the antenna swapping circuit to selectively couple various transmit and/or receive filters with any one or more of the multiple antenna ports to support uplink carrier aggregation (ULCA) and/or multiple-input multiple-output (MIMO) operations with a minimum number of transmit and receive filters. Transmit filters of adjacent RF bands are physically separated, but disposed in proximity, in the multi-band RF circuit to help reduce intermodulation products between the adjacent RF bands during the ULCA operation. As a result, it is possible to improve RF performance of ULCA and MIMO operations, without increasing complexity, cost, and footprint of the multi-band RF circuit.

20 Claims, 4 Drawing Sheets

(56) References Cited

U.S. PATENT DOCUMENTS

| | | | |
|---|---|---|---|
| 2009/0213770 A1* | 8/2009 | Mu | H04B 1/123 370/281 |
| 2011/0085477 A1* | 4/2011 | Schiff | H04B 7/15585 370/279 |
| 2011/0227664 A1* | 9/2011 | Wyville | H03H 11/344 333/17.1 |
| 2013/0176914 A1* | 7/2013 | Khlat | H04B 1/44 370/278 |
| 2016/0373176 A1* | 12/2016 | Khlat | H04B 7/0608 |

* cited by examiner

MULTI-BAND RADIO FREQUENCY CIRCUIT

RELATED APPLICATIONS

This application claims the benefit of U.S. Provisional Patent Application Ser. No. 62/430,703, filed Dec. 6, 2016, the disclosure of which is hereby incorporated herein by reference in its entirety.

FIELD OF THE DISCLOSURE

The technology of the disclosure relates generally to radio frequency (RF) circuits supporting multiple RF bands.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as long-term evolution (LTE). Particularly in light of carrier aggregation (CA) schemes supported by modern cellular communications networks, a mobile communication device can be configured to simultaneously transmit an outgoing radio frequency (RF) signal(s) in multiple uplink frequency bands, while receiving an incoming RF signal(s) in multiple downlink frequency bands. The uplink and downlink frequency bands supported by a mobile communication device can be generally categorized based on respective frequency spectrums for easy reference. Some of the most commonly referenced frequency band categories include low-band (LB), mid-low-band (MLB), mid-band (MB), and high-band (HB). The LB, the MLB, the MB, and the HB categories typically refer to frequency spectrums between 450-960 MHz, 1452-1496 MHz, 1710-2200 MHz, and 2300-2700 MHz, respectively.

Support for the multiple frequency bands is provided by multiple radio front-ends, each supporting one or more frequency bands. Each radio front-end may include a multiplexer(s) (e.g., a diplexer for a dual-band scenario, a triplexer for a tri-band scenario, a quadplexer for a quad-band scenario, or a pentaplexer for a penta-band scenario) that can be selectively coupled to an antenna port(s). Furthermore, the mobile communication device may include multiple antennas, each coupled to a respective antenna port, to support multiple-input multiple-output (MIMO) and/or RF beamforming operations. In this regard, it may be desired to optimize configurations between the multiple radio front-ends and the multiple antennas to support flexible band combinations without compromising RF performance of the mobile communication device.

SUMMARY

Embodiments of the disclosure include a multi-band radio frequency (RF) circuit. The multi-band RF circuit includes multiple antenna ports coupled to multiple antennas and an antenna swapping circuit coupled to the multiple antenna ports. Control circuitry in the multi-band RF circuit controls the antenna swapping circuit to selectively couple various transmit and/or receive filters with any one or more of the multiple antenna ports to support uplink carrier aggregation (ULCA) and/or multiple-input multiple-output (MIMO) operations with a minimum number of transmit and receive filters. Transmit filters of adjacent RF bands are physically separated, but disposed in proximity, in the multi-band RF circuit to help reduce intermodulation products between the adjacent RF bands during the ULCA operation. As a result, it is possible to improve RF performance of ULCA and MIMO operations, without increasing complexity, cost, and footprint of the multi-band RF circuit.

In one aspect, a multi-band RF circuit is provided. The multi-band RF circuit includes a first antenna port coupled to a first antenna. The multi-band RF circuit also includes a second antenna port coupled to a second antenna. The multi-band RF circuit also includes an antenna swapping circuit coupled to the first antenna port and the second antenna port. The antenna swapping circuit includes first RF circuitry coupled to the antenna swapping circuit. The first RF circuitry includes first amplifier circuitry configured to receive and amplify an RF transmit signal. The first RF circuitry also includes first filter circuitry comprising at least one first transmit filter configured to pass the RF transmit signal in a first RF transmit band. The multi-band RF circuit also includes second RF circuitry coupled to the antenna swapping circuit. The second RF circuitry includes second amplifier circuitry configured to receive and amplify the RF transmit signal. The second RF circuitry also includes second filter circuitry comprising at least one second transmit filter configured to pass the RF transmit signal in a second RF transmit band. The multi-band RF circuit also includes control circuitry. The control circuitry is configured to couple the at least one first transmit filter in the first RF circuitry to a first selected antenna port among the first antenna port and the second antenna port to transmit the RF transmit signal in the first RF transmit band. The control circuitry is also configured to couple the at least one second transmit filter in the second RF circuitry to a second selected antenna port among the first antenna port and the second antenna port to transmit the RF transmit signal concurrently in the second RF transmit band.

In another aspect, an electronic device is provided. The electronic device includes a top antenna section and a bottom antenna section. The electronic device also includes a first antenna and a second antenna provided in the bottom antenna section. The electronic device also includes a third antenna and a fourth antenna provided in the top antenna section. The electronic device also includes a multi-band RF circuit. The multi-band RF circuit includes a first antenna port, a second antenna port, a third antenna port, and a fourth antenna port coupled to the first antenna, the second antenna, the third antenna, and the fourth antenna, respectively. The multi-band RF circuit also includes an antenna swapping circuit coupled to the first antenna port, the second antenna port, the third antenna port, and the fourth antenna port. The multi-band RF circuit also includes first RF circuitry provided in the bottom antenna section and coupled to the antenna swapping circuit. The first RF circuitry includes first amplifier circuitry configured to receive and amplify an RF transmit signal. The first RF circuitry also includes first filter circuitry comprising at least one first transmit filter configured to pass the RF transmit signal in a first RF transmit band. The multi-band RF circuit also includes second RF circuitry provided in the bottom antenna section and coupled to the antenna swapping circuit. The second RF circuitry includes second amplifier circuitry configured to receive and amplify the RF transmit signal. The second RF circuitry also includes second filter circuitry comprising at least one second transmit filter configured to pass the RF transmit signal in a second RF transmit band. The multi-band RF circuit also includes envelope tracking (ET) tracker circuitry provide in the bottom antenna section and configured to provide a first modulated voltage and a second modulated voltage to the first amplifier circuitry and the second amplifier circuitry, respectively.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure include a multi-band radio frequency (RF) circuit. The multi-band RF circuit includes multiple antenna ports coupled to multiple antennas and an antenna swapping circuit coupled to the multiple antenna ports. Control circuitry in the multi-band RF circuit controls the antenna swapping circuit to selectively couple various transmit and/or receive filters with any one or more of the multiple antenna ports to support uplink carrier aggregation (ULCA) and/or multiple-input multiple-output (MIMO) operations with a minimum number of transmit and receive filters. Transmit filters of adjacent RF bands are physically separated, but disposed in proximity, in the multi-band RF circuit to help reduce intermodulation products between the adjacent RF bands during the ULCA operation. As a result, it is possible to improve RF performance of ULCA and MIMO operations, without increasing complexity, cost, and footprint of the multi-band RF circuit.

Figure 1:
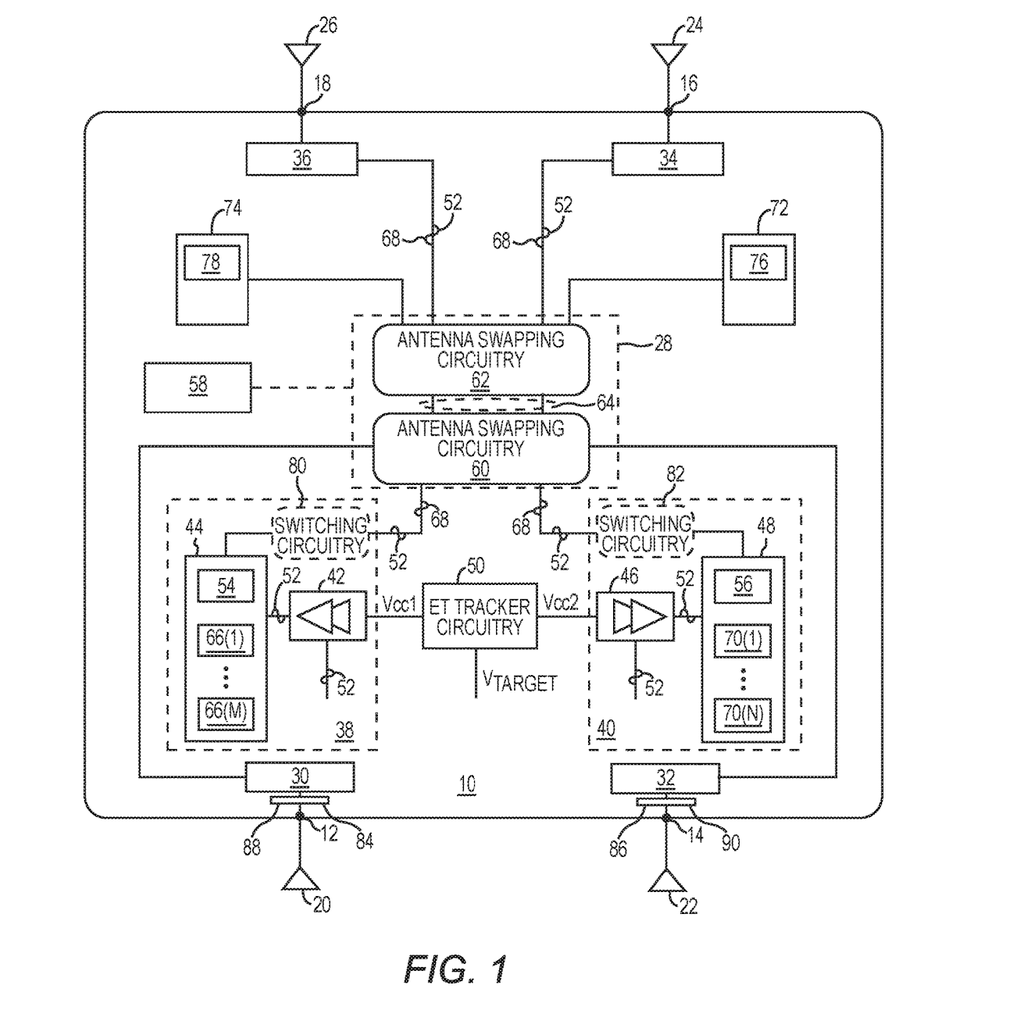
FIG. 1 is a schematic diagram of an exemplary multi-band radio frequency (RF) circuit configured to support uplink carrier aggregation (ULCA) and multiple-input multiple-output (MIMO) in selected uplink and downlink frequency bands.

FIG. 1 is a schematic diagram of an exemplary multi-band RF circuit 10 configured to support uplink carrier aggregation (ULCA) and multiple-input multiple-output (MIMO) in selected uplink and downlink frequency bands. As discussed in detail below, the multi-band RF circuit 10 provides an RF front-end architecture that can be flexibly adapted to support ULCA operation, non-ULCA operation, and/or MIMO operation in a variety of uplink and/or downlink frequency band combinations. Moreover, the multi-band RF circuit 10 can support concurrent ULCA and MIMO operations with minimum band filter insertion. As a result, it is possible to reduce design complexity, cost, and footprint of the multi-band RF circuit 10 for supporting concurrent ULCA and MIMO operations.

The multi-band RF circuit 10 includes a first antenna port 12, a second antenna port 14, a third antenna port 16, and a fourth antenna port 18 coupled to a first antenna 20, a second antenna 22, a third antenna 24, and a fourth antenna 26, respectively. In a non-limiting example, the first antenna 20 is a primary transmit and receive antenna. The second antenna 22 is a receive diversity antenna. The third antenna 24 and the fourth antenna 26 are MIMO receive antennas. Notably, the first antenna 20, the second antenna 22, the third antenna 24, and the fourth antenna 26 are provided and illustrated herein as non-limiting examples. It should be appreciated that the multi-band RF circuit 10 can be configured to include more or less than four antennas without affecting the operation principles discussed hereinafter.

The multi-band RF circuit 10 includes an antenna swapping circuit 28 coupled to the first antenna port 12, the second antenna port 14, the third antenna port 16, and the fourth antenna port 18. The multi-band RF circuit 10 may include first antenna multiplexer circuitry 30, second antenna multiplexer circuitry 32, third antenna multiplexer circuitry 34, and fourth antenna multiplexer circuitry 36 that are coupled to the first antenna port 12, the second antenna port 14, the third antenna port 16, and the fourth antenna port 18, respectively. In a non-limiting example, the antenna swapping circuit 28 is coupled to the first antenna port 12, the second antenna port 14, the third antenna port 16, and the fourth antenna port 18 via the first antenna multiplexer circuitry 30, the second antenna multiplexer circuitry 32, the third antenna multiplexer circuitry 34, and the fourth antenna multiplexer circuitry 36, respectively.

The multi-band RF circuit 10 includes first RF circuitry 38 and second RF circuitry 40. As is further illustrated in FIG. 3A, the first RF circuitry 38 and the second RF circuitry 40 may be provided in proximity to each other in the multi-band RF circuit 10. In addition, the first RF circuitry 38 and the second RF circuitry 40 are also provided in close proximity (e.g., ≤5 millimeters) from the first antenna port 12 and the second antenna port 14, respectively. The first RF circuitry 38 includes first amplifier circuitry 42 and first filter circuitry 44. The second RF circuitry 40 includes second amplifier circuitry 46 and second filter circuitry 48. The multi-band RF circuit 10 includes envelope tracking (ET) tracker circuitry 50 configured to generate a first modulated voltage $V_{CC1}$ and a second modulated voltage $V_{CC2}$ based on at least one modulated target voltage $V_{TARGET}$. In a non-limiting example, the modulated voltage $V_{TARGET}$ can be an ET modulated target voltage. Accordingly, the first modulated voltage $V_{CC1}$ and/or the second modulated voltage $V_{CC2}$ can be an ET modulated voltage tracking the ET modulated target voltage. The ET tracker circuitry 50 is coupled to the first amplifier circuitry 42 and the second amplifier circuitry 46. In this regard, the ET tracker circuitry 50 provides the first modulated voltage $V_{CC1}$ and the second modulated voltage $V_{CC2}$ to the first amplifier circuitry 42 and the second amplifier circuitry 46, respectively.

Figure 3A:
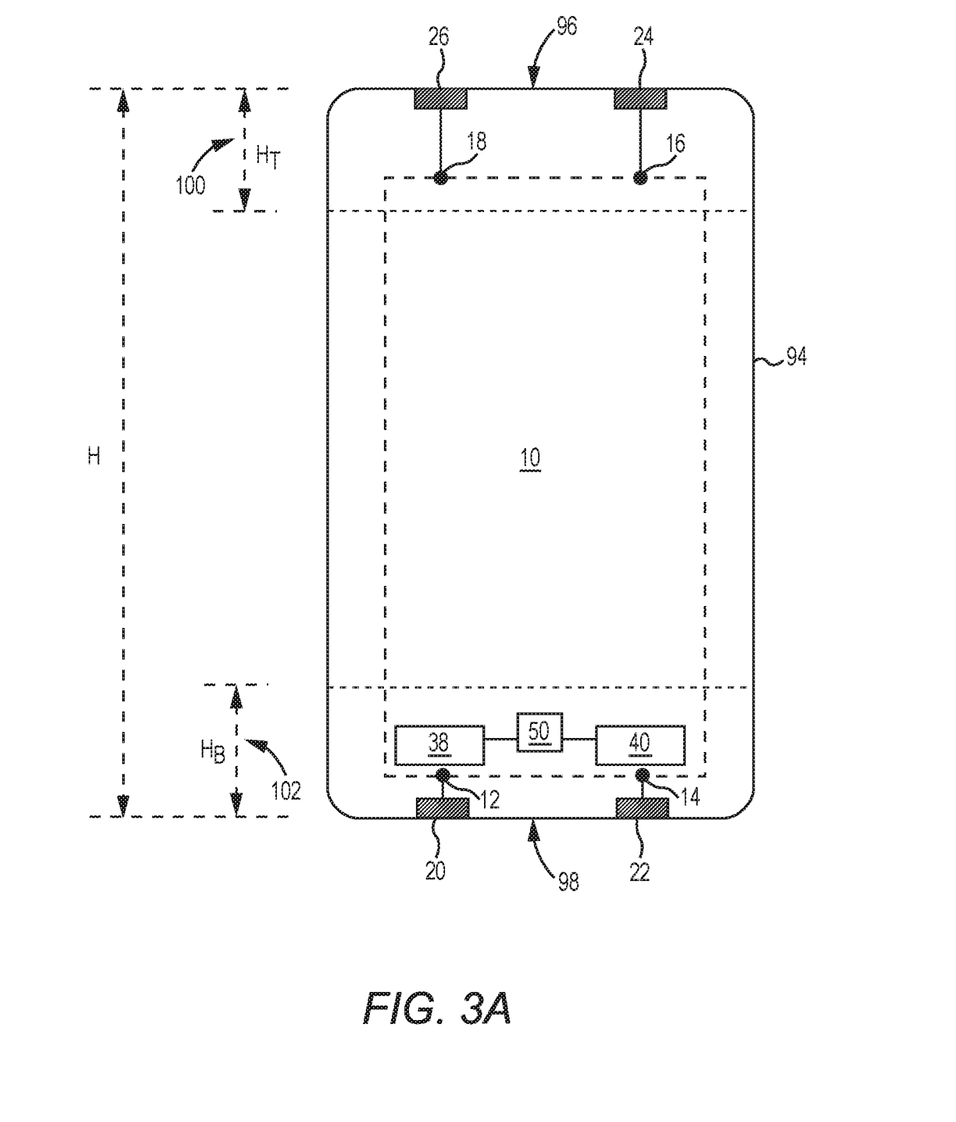
FIG. 3A is a schematic diagram of an exemplary electronic device incorporating the multi-band RF circuit of FIG. 1.

The ET tracker circuitry 50 may be provided in proximity to the first RF circuitry 38 and the second RF circuitry 40, as further illustrated in FIG. 3A. For example, when the first RF circuitry 38 and the second RF circuitry 40 are provided side-by-side along the bottom edge of the smartphone form factor, the ET tracker circuitry 50 is also provided closer to the bottom edge, than to a top edge, of the smartphone form factor. As such, the ET tracker circuitry 50 can provide the first modulated voltage $V_{CC1}$ and the second modulated voltage $V_{CC2}$ to the first RF circuitry 38 and the second RF circuitry 40 via a relatively shorter wiring route. As a result, it may be possible to reduce distortion to the first modulated voltage $V_{CC1}$ and/or the second modulated voltage $V_{CC2}$.

The first amplifier circuitry 42 is configured to receive and amplify an RF transmit signal 52. The first filter circuitry 44 is coupled to the first amplifier circuitry 42 to receive the RF transmit signal 52. The first filter circuitry 44 includes at least one first RF transmit filter 54 configured to pass the RF transmit signal in a first RF transmit band.

The second amplifier circuitry 46 is configure to receive and amplify the RF transmit signal 52. The second filter circuitry 48 is coupled to the second amplifier circuitry 46 to receive the RF transmit signal 52. The second filter circuitry 48 includes at least one second RF transmit filter 56 configured to pass the RF transmit signal in a second RF transmit band.

The first transmit filter 54 may be configured to pass the RF transmit signal 52 in a mid-high (MH) frequency band that occupies an MH frequency spectrum between 1800 MHz (inclusive) and 2200 MHz (inclusive). In a non-limiting example, the MH frequency band can include long-term evolution (LTE) uplink band 1 (1920-1980 MHz) and LTE uplink band 25 (1850-1915 MHz).

The second transmit filter 56 may be configured to pass the RF transmit signal 52 in a mid-low (ML) frequency band that occupies an ML frequency spectrum between 1700 MHz (exclusive) and 1800 MHz (exclusive). In a non-limiting example, the ML frequency band can include LTE uplink band 3 (1710-1785 MHz), LTE uplink band 4 (1710-1755 MHz), and LTE uplink band 66 (1710-1780 MHz).

In the ULCA operation, the multi-band RF circuit 10 may need to transmit the RF transmit signal 52 simultaneously in the LTE uplink band 1 and the LTE uplink band 3. Notably, the LTE uplink band 3 has a maximum frequency of 1785 MHz and the LTE uplink band 1 has a minimum frequency of 1920 MHz. As such, if the first transmit filter 54 and the second transmit filter 56 are both provided in the first filter circuitry 44, for example, intermodulation products may result due to inherent nonlinearity of the first amplifier circuitry 42. The intermodulation products may fall into one or more LTE downlink bands, such as LTE downlink band 3 (1805-1880 MHz), thus causing receiver saturation in the affected LTE downlink bands. Hence, it is necessary to provide sufficient separation between the first filter circuitry 44 and the second filter circuitry 48 to suppress intermodulation products when operating in the ULCA mode.

Thus, by providing the first transmit filter 54 in the first filter circuitry 44 to pass the RF transmit signal 52 in the MH frequency band (e.g., LTE uplink band 1 and 25) and providing the second transmit filter 56 in the second filter circuitry 48 to pass the RF transmit signal 52 in the ML frequency band (e.g., LTE uplink band 3, 4, and 66), it may be possible to create sufficient spatial separation between the MH frequency band and the ML frequency band, thus helping to suppress the intermodulation products in the ULCA operation. As a result, it is possible to improve RF performance of the multi-band RF circuit 10 in the ULCA operation.

The multi-band RF circuit 10 includes control circuitry 58 that is coupled to the antenna swapping circuit 28. The control circuitry 58 may be enabled by a microprocessor, a microcontroller, or a field programmable gate array (FPGA). During the ULCA mode, the control circuitry 58 may couple the first transmit filter 54 to a first selected antenna port (e.g., the first antenna port 12) among the first antenna port 12, the second antenna port 14, the third antenna port 16, and the fourth antenna port 18 to transmit the RF transmit signal 52 in the first RF transmit band (e.g., LTE uplink band 1). Concurrently, the control circuitry 58 may couple the second transmit filter 56 to a second selected antenna port (e.g., the second antenna port 14) among the first antenna port 12, the second antenna port 14, the third antenna port 16, and the fourth antenna port 18 to transmit the RF transmit signal 52 in the second RF transmit band (e.g., LTE uplink band 3, LTE uplink band 4, and LTE uplink band 66).

In a non-limiting example, the antenna swapping circuit 28 can be configured to include first antenna swapping circuitry 60 and second antenna swapping circuitry 62. The first antenna swapping circuitry 60 and the second antenna swapping circuitry 62 can each include one or more switches that are controllable by the control circuitry 58. The first antenna swapping circuitry 60 is coupled to the second antenna swapping circuitry 62 by a coaxial cable pair 64. In one embodiment, the first antenna swapping circuitry 60 is coupled to the first antenna port 12, the second antenna port 14, the first filter circuitry 44, and the second filter circuitry 48, while the second antenna swapping circuitry 62 is coupled to the third antenna port 16 and the fourth antenna port 18.

The first antenna swapping circuitry 60 and the second antenna swapping circuitry 62 can enable flexible antenna coupling and signal routing in the multi-band RF circuit 10. In one example, the control circuitry 58 can couple the first transmit filter 54 to the second antenna port 14 and/or couple the second transmit filter 56 to the first antenna port 12 via the first antenna swapping circuitry 60. In another example, the control circuitry 58 can couple the first transmit filter 54 and/or the second transmit filter 56 to the third antenna port 16 and/or the fourth antenna port 18 via the first antenna swapping circuitry 60 and the second antenna swapping circuitry 62. As such, it is not necessary to replicate the first transmit filter 54 and/or the second transmit filter 56 (e.g., for the third antenna port 16 and the fourth antenna port 18) to be able to transmit the RF transmit signal 52 via the third antenna 24 and/or the fourth antenna 26.

In this regard, in the ULCA mode, the control circuitry 58 can flexibly couple the first transmit filter 54 and the second transmit filter 56 to any of the first antenna port 12, the second antenna port 14, the third antenna port 16, and the fourth antenna port 18 via the first antenna swapping circuitry 60 and the second antenna swapping circuitry 62. The control circuitry 58 may couple the first transmit filter 54 and the second transmit filter 56 to the first antenna port 12 and the second antenna port 14, respectively. The control circuitry 58 may couple the first transmit filter 54 and the second transmit filter 56 to the first antenna port 12 and the third antenna port 16, respectively. The control circuitry 58 may couple the first transmit filter 54 and the second transmit filter 56 to the first antenna port 12 and the fourth antenna port 18, respectively. The control circuitry 58 may couple the first transmit filter 54 and the second transmit filter 56 to the third antenna port 16 and the second antenna port 14, respectively. The control circuitry 58 may couple the first transmit filter 54 and the second transmit filter 56 to the fourth antenna port 18 and the second antenna port 14, respectively. Notably, it may be possible to support other antenna port coupling scenarios not explicitly mentioned above via the first antenna swapping circuitry 60 and the second antenna swapping circuitry 62.

The first filter circuitry 44 includes one or more first receive filters 66(1)-66(M) configured to pass an RF receive signal 68 in one or more first RF receive bands. In a non-limiting example, the first receive filters 66(1)-66(M) can include filters configured to pass the RF receive signal 68 in LTE downlink band 1 (2110-2170 MHz) and LTE downlink band 25 (1930-1995 MHz). Notably, other LTE downlink bands may also be supported by the first filter circuitry 44 by including appropriate receive filters among the first receive filters 66(1)-66(M).

The second filter circuitry 48 includes one or more second receive filters 70(1)-70(N) configured to pass the RF receive signal 68 in one or more second RF receive bands. In a non-limiting example, the second receive filters 70(1)-70(N) can include filters configured to pass the RF receive signal 68 in LTE downlink band 3 (1805-1880 MHz), LTE downlink band 4 (2110-2155 MHz), LTE downlink band 25 (1930-1995 MHz), LTE downlink band 30 (2350-2360 MHz), and LTE downlink band 66 (2110-2200 MHz). Notably, other LTE downlink bands may also be supported by the second filter circuitry 48 by including appropriate receive filters among the second receive filters 70(1)-70(N).

The multi-band RF circuit 10 may also include third filter circuitry 72 and fourth filter circuitry 74 that are coupled to the antenna swapping circuit 28. The third filter circuitry 72 includes at least one third receive filter 76 and the fourth filter circuitry 74 includes at least one fourth receive filter 78. In a non-limiting example, the third filter circuitry 72 can be configured to pass the RF receive signal 68 in LTE downlink band 25 (1930-1995 MHz) and LTE downlink band 30 (2350-2360 MHz) by providing appropriate receive filter(s) as the third receive filter 76. In another non-limiting example, the fourth filter circuitry 74 can be configured to pass the RF receive signal 68 in the LTE downlink band 25 (1930-1995 MHz) and the LTE downlink band 30 (2350-2360 MHz) by providing appropriate receive filter(s) as the fourth receive filter 78. Notably, the third filter circuitry 72 and the fourth filter circuitry 74 can be configured to support other LTE downlink bands as appropriate by including corresponding receive filters.

The control circuitry 58 can flexibly couple any of the first receive filters 66(1)-66(M), the second receive filters 70(1)-70(N), the third receive filter 76, and the fourth receive filter 78 to any of the first antenna port 12, the second antenna port 14, the third antenna port 16, and the fourth antenna port 18 to support MIMO mode operation concurrent to the ULCA mode operation. In one non-limiting example, the control circuitry 58 can couple any of the first receive filters 66(1)-66(M) to the first antenna port 12, the third antenna port 16, and the fourth antenna port 18 to receive the RF receive signal 68, while coupling the first transmit filter 54 and the second transmit filter 56 to the first antenna port 12 and the second antenna port 14 to transmit the RF transmit signal 52 in the first RF transmit band and the second RF transmit band, respectively. In another non-limiting example, the control circuitry 58 can couple any of the second receive filters 70(1)-70(N) to the second antenna port 14, the third antenna port 16, and the fourth antenna port 18 to receive the RF receive signal 68, while coupling the first transmit filter 54 and the second transmit filter 56 to the first antenna port 12 and the second antenna port 14 to transmit the RF transmit signal 52 in the first RT transmit band and the second RF transmit band, respectively.

The multi-band RF circuit 10 may include first switching circuitry 80 and second switching circuitry 82. The first switching circuitry 80 is coupled between the first filter circuitry 44 and the antenna swapping circuit 28. The second switching circuitry 82 is coupled between the second filter circuitry 48 and the antenna swapping circuit 28. Each of the first switching circuitry 80 and the second switching circuitry 82 includes one or more switches that are controllable by the control circuitry 58. Thus, by opening and/or closing appropriate switches in the first switching circuitry 80, the control circuitry 58 can flexibly couple the first transmit filter 54 and any of the first receive filters 66(1)-66(M) to the antenna swapping circuit 28 to support concurrent ULCA and MIMO operations. Likewise, by opening and/or closing appropriate switches in the second switching circuitry 82, the control circuitry 58 can flexibly couple the second transmit filter 56 and any of the second receive filters 70(1)-70(N) to the antenna swapping circuit 28 to support concurrent ULCA and MIMO operations.

In addition to supporting the ULCA and the MIMO operations, the multi-band RF circuit 10 can also be configured to support non-ULCA operation. In one non-limiting example, the control circuitry 58 can couple the first transmit filter 54 to the first antenna port 12 to transmit the RF transmit signal 52 in the first RF transmit band, while decoupling the second transmit filter 56 from the second antenna port 14. In another non-limiting example, the control circuitry 58 can couple the second transmit filter 56 to the second antenna port 14 to transmit the RF transmit signal 52 in the second RF transmit band, while decoupling the first transmit filter 54 from the first antenna port 12. Notably, the control circuitry 58 may control the first filter circuitry 44 and/or the second filter circuitry 48 to support MIMO operation concurrently to support the non-ULCA operation.

When the first antenna 20 and the second antenna 22 are transmitting concurrently in the LTE uplink band 1 and LTE uplink band 3, for example, during the ULCA operation, RF interference may occur between the first antenna 20 and the second antenna 22 due to antenna coupling. As such, it may be necessary to mitigate potential RF interferences between the first antenna 20 and the second antenna 22.

In this regard, in one embodiment, the multi-band RF circuit 10 may include a first band stop filter 84 coupled between the first antenna multiplexer circuitry 30 and the first antenna port 12. The multi-band RF circuit 10 may also include a second band stop filter 86 coupled between the second antenna multiplexer circuitry 32 and the second antenna port 14. The first band stop filter 84 may be configured to block RF frequencies between 1710-1785 MHz, thus helping to suppress potential RF interference to the LTE uplink band 3 transmitted by the second antenna 22. Likewise, the second band stop filter 86 may be configured to block RF frequencies between 1920-1980 MHz, thus helping to suppress potential RF interference to the LTE uplink band 1 transmitted by the first antenna 20. Notably, the first band stop filter 84 and the second band stop filter 86 can provide power reflections to help improve RF isolation between the first antenna 20 and the second antenna 22 between the first RF transmit band (e.g., LTE uplink band 1) and the second RF transmit band (e.g., LTE uplink band 3). In this regard, it may be possible to relax isolation requirements of the first receive filters 66(1)-66(M) and/or the second receive filters 70(1)-70(N), thus helping to reduce cost and footprint of the receive filters.

It may also be possible to improve RF isolation between the first antenna 20 and the second antenna 22 by means of band select multiplexers that are highly reflective at appropriate phases. Acoustic filters, such as bulk acoustic wave (BAW) filters and surface acoustic wave (SAW) filters, are inherently reflective at out of band frequencies. As such, the first band stop filter 84 and the second band stop filter 86 may be implemented as BAW or SAW filters.

In an alternative embodiment, the first band stop filter 84 and the second band stop filter 86 may be replaced by a first phase shifter 88 and a second phase shifter 90. The first phase shifter 88 may be provided between the first antenna multiplexer circuitry 30 and the first antenna port 12. The second phase shifter 90 may be provided between the second antenna multiplexer circuitry 32 and the second antenna port 14. Notably, the first phase shifter 88 may also be provided between the antenna swapping circuit 28 and the first antenna multiplexer circuitry 30. Likewise, the second phase shifter 90 may also be provided between the antenna swapping circuit 28 and the second antenna multiplexer circuitry 32.

The first phase shifter 88 may be configured to change a respective phase of the RF transmit signal 52 in the first RF band (e.g., LTE uplink band 1) such that the RF transmit signal 52 transmitted from the first antenna 20 does not cause any loading on the second antenna 22. Likewise, the second phase shifter 90 may be configured to change a respective phase of the RF transmit signal 52 in the second RF band (e.g., LTE uplink band 3) such that the RF transmit signal 52 transmitted from the second antenna 22 does not cause any loading on the first antenna 20. As a result, the first antenna 20 and the second antenna 22 can transmit the RF transmit signal 52 in the first RF transmit band and the second RF transmit band during the ULCA operation with improved radiation efficiency.

Figure 2:
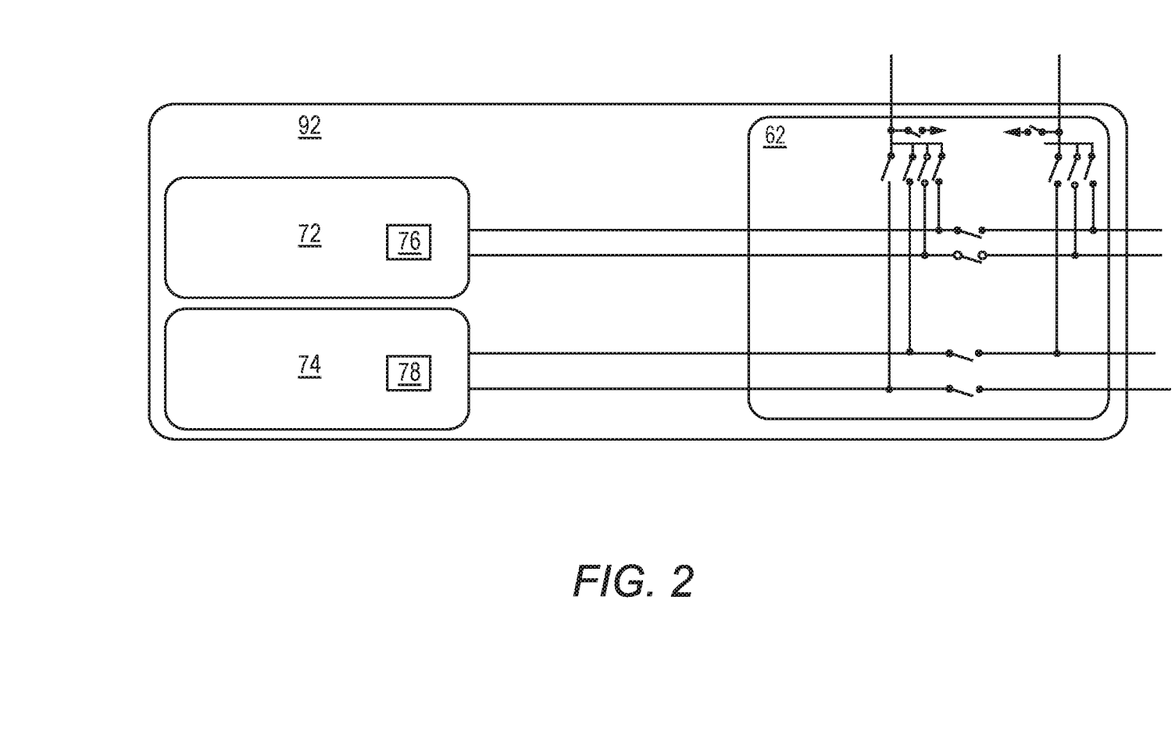
FIG. 2 is a schematic diagram of an exemplary integrated diversity filter circuit that can be provided in the multi-band RF circuit of FIG. 1.

The third filter circuitry 72 and the fourth filter circuitry 74 can be integrated into an integrated filter circuitry, as shown in FIG. 2. FIG. 2 is a schematic diagram of an exemplary integrated diversity filter circuit 92 including the third filter circuitry 72 and the fourth filter circuitry 74 of FIG. 1. Common elements between FIGS. 1 and 2 are shown therein with common element numbers and will not be re-described herein.

The third receive filter 76 and the fourth receive filter 78 may be provided as BAW and/or SAW filters in the integrated diversity filter circuit 92. As such, the third receive filter 76 and the fourth receive filter 78 may be fabricated on a same acoustic die, thus helping to reduce a footprint of the integrated diversity filter circuit 92 as well as the multi-band RF circuit 10. In addition, it may also be possible to integrate the second antenna swapping circuitry 62 into the integrated diversity filter circuit 92.

The multi-band RF circuit 10 of FIG. 1 may be provided in an electronic device such as a smartphone. In this regard, FIG. 3A is a schematic diagram of an exemplary electronic device 94 incorporating the multi-band RF circuit 10 of FIG. 1. Common elements between FIGS. 1 and 3A are shown therein with common element numbers and will not be re-described herein.

The electronic device 94 has a top edge 96 and a bottom edge 98. The electronic device 94 includes a top antenna section 100, in which the third antenna 24 and the fourth antenna 26 are disposed. The electronic device 94 also includes a bottom antenna section 102, in which the first antenna 20 and the second antenna 22 are disposed. The electronic device 94 has a total height H that is measured from the top edge 96 to the bottom edge 98. The top antenna section 100 has a top antenna section height $H_T$ and the bottom antenna section has a bottom antenna section height $H_B$. In a non-limiting example, the bottom antenna section height $H_B$ is between five to ten percent (5-10%) of the total height H.

In this regard, the first RF circuitry 38, the second RF circuitry 40, and the ET tracker circuitry 50 are said to be provided in proximity when the first RF circuitry 38, the second RF circuitry 40, and the ET tracker circuitry 50 are all provided within the bottom antenna section 102 of the electronic device 94. Furthermore, the first RF circuitry 38 and the second RF circuitry 40 may be disposed laterally side-by-side along the bottom edge 98 of the electronic device 94.

Figure 3B:
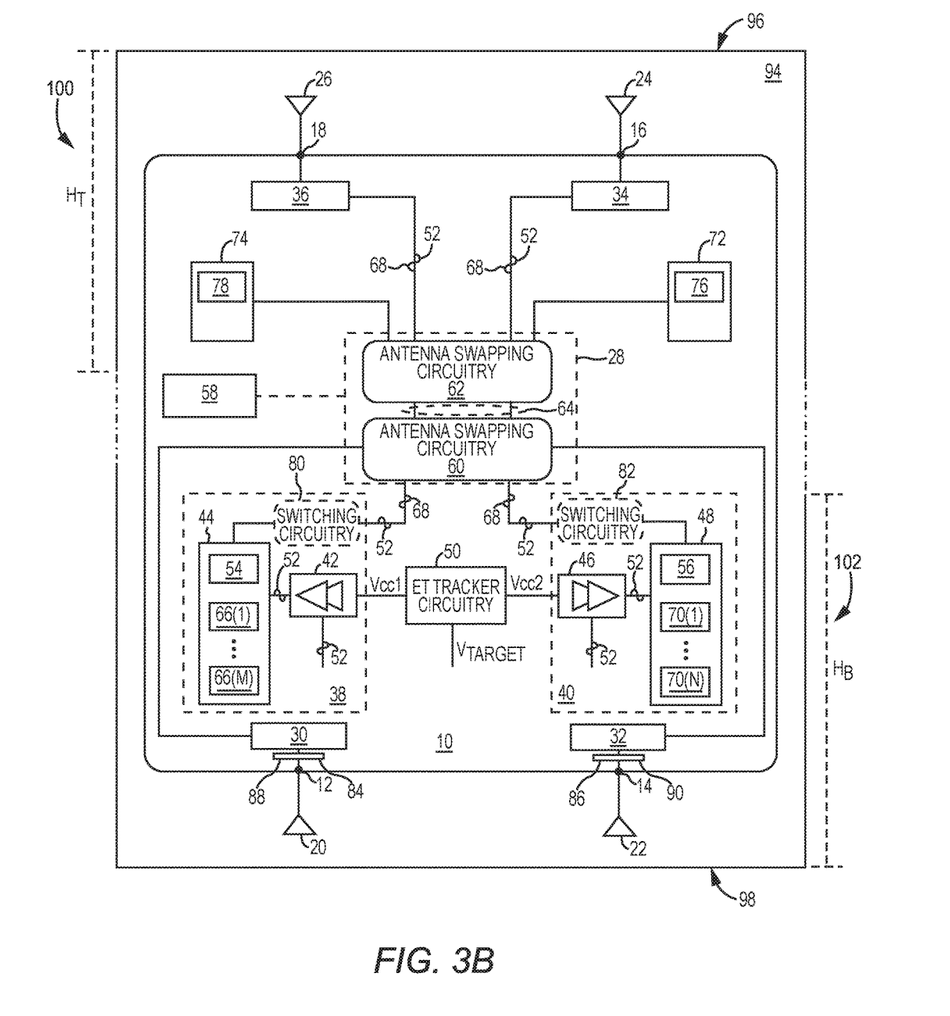
FIG. 3B is a schematic diagram providing another illustration of the electronic device of FIG. 3A.

FIG. 3B is a schematic diagram providing another illustration of the electronic device 94 of FIG. 3A. Common elements between FIGS. 1, 3A, and 3B are shown therein with common element numbers and will not be re-described herein.

Those skilled in the art will recognize improvements and modifications to the preferred embodiments of the present disclosure. All such improvements and modifications are considered within the scope of the concepts disclosed herein and the claims that follow.

What is claimed is:

1. A multi-band radio frequency (RF) circuit comprising:
   a first antenna port coupled to a first antenna;
   a second antenna port coupled to a second antenna;
   an antenna swapping circuit coupled to the first antenna port and the second antenna port;
   first RF circuitry coupled to the antenna swapping circuit and comprising:
     first amplifier circuitry configured to receive and amplify an RF transmit signal; and
     first filter circuitry comprising at least one first transmit filter configured to pass the RF transmit signal in a first RF transmit band;
   second RF circuitry coupled to the antenna swapping circuit and comprising:
     second amplifier circuitry configured to receive and amplify the RF transmit signal; and
     second filter circuitry comprising at least one second transmit filter configured to pass the RF transmit signal in a second RF transmit band; and
   control circuitry configured to:
     couple the at least one first transmit filter in the first RF circuitry to a first selected antenna port among the first antenna port and the second antenna port to transmit the RF transmit signal in the first RF transmit band; and
     couple the at least one second transmit filter in the second RF circuitry to a second selected antenna port among the first antenna port and the second antenna port to transmit the RF transmit signal concurrently in the second RF transmit band.

2. The multi-band RF circuit of claim 1 further comprising envelope tracking (ET) tracker circuitry configured to provide a first modulated voltage and a second modulated voltage to the first amplifier circuitry and the second amplifier circuitry, respectively.

3. The multi-band RF circuit of claim 2 wherein:
   the first RF circuitry is provided in proximity to the second RF circuitry;
   the first RF circuitry is provided in proximity to the first antenna port;
   the second RF circuitry is provided in proximity to the second antenna port; and
   the ET tracker circuitry is provided in proximity to the first RF circuitry and the second RF circuitry.

4. The multi-band RF circuit of claim 1 wherein:
   the first RF transmit band corresponds to a first uplink frequency spectrum higher than 1800 megahertz (MHz) and lower than 2200 MHz; and
   the second RF transmit band corresponds to a second uplink frequency spectrum higher than 1700 MHz and lower than 1800 MHz.

5. The multi-band RF circuit of claim 1 wherein:
   the first RF transmit band comprises a first long-term evolution (LTE) uplink band selected from the group consisting of: LTE uplink band 1; and LTE uplink band 25; and
   the second RF transmit band comprises a second LTE uplink band selected from the group consisting of: LTE uplink band 3; LTE uplink band 4; and LTE uplink band 66.

6. The multi-band RF circuit of claim 1 configured to operate in an uplink carrier aggregation (ULCA) mode and a non-ULCA mode.

7. The multi-band RF circuit of claim 6 wherein:
   the first filter circuitry further comprises one or more first receive filters configured to pass an RF receive signal in one or more first RF receive bands; and
   the second filter circuitry further comprises one or more second receive filters configured to pass the RF receive signal in one or more second RF receive bands.

8. The multi-band RF circuit of claim 7 wherein in the ULCA mode, the control circuitry is further configured to couple the at least one first transmit filter and the at least one second transmit filter to the first antenna port and the second antenna port, respectively.

9. The multi-band RF circuit of claim 7 further comprising:
   a third antenna port coupled to the antenna swapping circuit and a third antenna; and
   a fourth antenna port coupled to the antenna swapping circuit and a fourth antenna.

10. The multi-band RF circuit of claim 9 wherein in the ULCA mode, the control circuitry is further configured to couple the at least one first transmit filter and the at least one second transmit filter to the first antenna port and the third antenna port, respectively.

11. The multi-band RF circuit of claim 9 wherein in the ULCA mode, the control circuitry is further configured to couple the at least one first transmit filter and the at least one second transmit filter to the first antenna port and the fourth antenna port, respectively.

12. The multi-band RF circuit of claim 9 wherein in the ULCA mode, the control circuitry is further configured to couple the at least one first transmit filter and the at least one second transmit filter to the third antenna port and the second antenna port, respectively.

13. The multi-band RF circuit of claim 9 wherein in the ULCA mode, the control circuitry is further configured to couple the at least one first transmit filter and the at least one second transmit filter to the fourth antenna port and the second antenna port, respectively.

14. The multi-band RF circuit of claim 9 wherein in the ULCA mode the control circuitry is further configured to couple any one of the one or more first receive filters to the first antenna port, the third antenna port, and the fourth antenna port to receive concurrently the RF receive signal in the one or more first RF receive bands.

15. The multi-band RF circuit of claim 9 wherein in the ULCA mode the control circuitry is further configured to couple any one of the one or more second receive filters to the second antenna port, the third antenna port, and the fourth antenna port to receive concurrently the RF receive signal in the one or more second RF receive bands.

16. The multi-band RF circuit of claim 15 wherein the one or more first RF receive bands include one or more long-term evolution (LTE) downlink frequency bands selected from the group consisting of: LTE downlink band 1; and LTE downlink band 25.

17. The multi-band RF circuit of claim 15 wherein the one or more second RF receive bands include one or more long-term evolution (LTE) downlink frequency bands selected from the group consisting of: LTE downlink band 3; LTE downlink band 4; LTE downlink band 25; LTE downlink band 30; and LTE downlink band 66.

18. The multi-band RF circuit of claim 8 wherein in the non-ULCA mode, the control circuitry is further configured to:
 couple the at least one first transmit filter in the first RF circuitry to the first antenna port to transmit the RF transmit signal in the first RF transmit band; and
 decouple the at least one second transmit filter in the second RF circuitry from the second antenna port.

19. The multi-band RF circuit of claim 8 wherein in the non-ULCA mode, the control circuitry is further configured to:
 decouple the at least one first transmit filter in the first RF circuitry from the first antenna port; and
 couple the at least one second transmit filter in the second RF circuitry to the second antenna port to transmit the RF transmit signal concurrently in the second RF transmit band.

20. The multi-band RF circuit of claim 1 further comprising:
 a first phase shifter coupled to the first antenna port and configured to adjust a respective phase of the RF transmit signal transmitted from the first antenna in the first RF transmit band; and
 a second phase shifter coupled to the second antenna port and configured to adjust a respective phase of the RF transmit signal transmitted from the second antenna in the second RF transmit band.

* * * * *